United States Patent [19]

Takenaka

[11] 4,176,556
[45] Dec. 4, 1979

[54] ELECTRONIC THERMOMETER

[75] Inventor: Kunio Takenaka, Nagaokakyo, Japan

[73] Assignee: Omron Tateisi Electronics Co., Kyoto, Japan

[21] Appl. No.: 849,805

[22] Filed: Nov. 8, 1977

[30] Foreign Application Priority Data

| | | | |
|---|---|---|---|
| Jun. 17, 1977 | [JP] | Japan | 52-72522 |
| Jun. 20, 1977 | [JP] | Japan | 52-73756 |
| Jun. 22, 1977 | [JP] | Japan | 52-74651 |
| Jun. 22, 1977 | [JP] | Japan | 52-74652 |
| Aug. 10, 1977 | [JP] | Japan | 52-96346 |
| Aug. 10, 1977 | [JP] | Japan | 52-96347 |

[51] Int. Cl.$^2$ ............................................. G01K 7/24
[52] U.S. Cl. ............................................... 73/362 AR
[58] Field of Search ................................... 73/362 AR

[56] References Cited

U.S. PATENT DOCUMENTS

| | | | |
|---|---|---|---|
| 3,620,082 | 11/1971 | Peters | 73/362 AR |
| 3,702,072 | 11/1972 | Georgi | 73/362 AR |
| 3,702,076 | 11/1972 | Georgi | 73/362 AR |
| 3,875,503 | 4/1975 | Hayashi | 73/362 AR |
| 3,911,374 | 10/1975 | Bussc | 73/362 AR |
| 4,009,615 | 3/1977 | Ruhl | 73/362 AR |

*Primary Examiner*—S. Clement Swisher
*Attorney, Agent, or Firm*—Stevens, Davis, Miller & Mosher

[57] ABSTRACT

An electronic thermometer utilizes a microprocessor, a bridge circuit containing a temperature responsive transducer, a charge and discharge circuit, and an interrupt signal generating circuit, to provide an accurate temperature measurement while reducing the size of the measuring apparatus. A counted value corresponding to a reference temperature is added to a counted value corresponding to the time it takes a capacitor connected to the bridge circuit to discharge, and the result is converted to a temperature degree displayed after operation in the microprocessor.

10 Claims, 9 Drawing Figures

4,176,556

ELECTRONIC THERMOMETER

BRIEF SUMMARY OF THE INVENTION

This invention relates to an electronic clinical thermometer, and particularly to an improved thermometer utilizing a microprocessor. This invention also relates to an improved thermometer for displaying the output from an temperature responsive transducer in a digital display, particularly within a given temperature measuring range.

A conventional electronic thermometer needs a separate counter for comparison of temperature, holding of the highest temperature, or the like. This is disadvantageous since it results in a large volume for the electronic thermometer because of the large size of its counter. In addition, the electronic output from a temperature responsive transducer is precisely in proportion to a temperature within a predetermined temperature range, though not as precise when out of said range. Thereofore, accurate readings cannot be obtained if the output from the temperature responsive transducer is displayed on the digital readout when operating out of said temperature range. If no indication is provided when an out-of-range condition occurs there is no way of knowing if the thermometer is in operation.

Accordingly, an object of the present invention is to provide an improved electronic thermometer of small-size which does not use a conventional large-sized counter.

Another object of the present invention is to provide novel means for correcting an error produced when a counting step preformed in the microprocessor operating sequence is interrupted by an interrupt signal.

A further object of the present invention is to provide an improved electronic thermometer having an alarm indicating that a temperature is out of temperature measuring range.

Another object of the present invention is to provide means for displaying "H" when a temperature is over the measuring range and displaying "L" when below the measuring range.

This invention provides an electronic thermometer utilizing a microprocessor which does not need any large size counter. Accordingly, it may be made small in size. The electronic thermometer comprises a bridge circuit having a temperature responsive transducer inserted into an arm thereof which generates an unbalanced voltage with a predetermined polarity when a reference temperature is exceeded; a capacitor connected to the temperature responsive transducer; a charge-and-discharge circuit charged by said unbalanced voltage; a microprocessor provided with a reference value corresponding to the reference temperature, a counting step which counts to a value corresponding to the reference value, and a detecting step for detecting if the reference temperature is exceeded after deriving from the counting step when the counted value reaches the reference value and for impressing a discharge signal on the charge-and-discharge circuit when the reference temperature is exceeded; and, an signal interrupt circuit responsive to the charged voltage of the charge-and-discharge circuit being reduced to a predetermined value for applying an interrupt to the microprocessor upon detecting a state where the discharging reaches a constant value; the microprocessor interrupting the performance of the counting step in response to receipt of the interrupt signal and performing an operation sequence including counting a temperature by reading a counted value reached in the counting step, and thereafter counting to a predetermined value after restarting the counting step.

The above electronic thermometer functions such that the count of the counting step, which is started on the start of capacitor discharge, is interrupted by the interrupt signal. The interrupted point in said counting step varies in accordance with the time it takes the charge-and-discharge circuit to discharge to a predetermined constant voltage, e.g., zero. Because the counting step is interrupted, a possibility exists that a counted value at the interrupted point is incorrectly read, and another possibility exists that the counted value at which the counting step recommences operation following interruption also is misscounted on recounting. The reason for these errors will be explained hereinafter.

The present invention takes care of erroneous counted values which may be caused by an interruption of the counting step and provides a microprocessor based electronic thermometer which prevents any counting errors in the restarted counting step following an interrupt by using a correcting step included in the above operation sequence to correct the counted value in the counting step. Further objects of the present invention will be apparent from the following description taken with the accompanying drawings.

DETAILED DESCRIPTION

Figure 1:
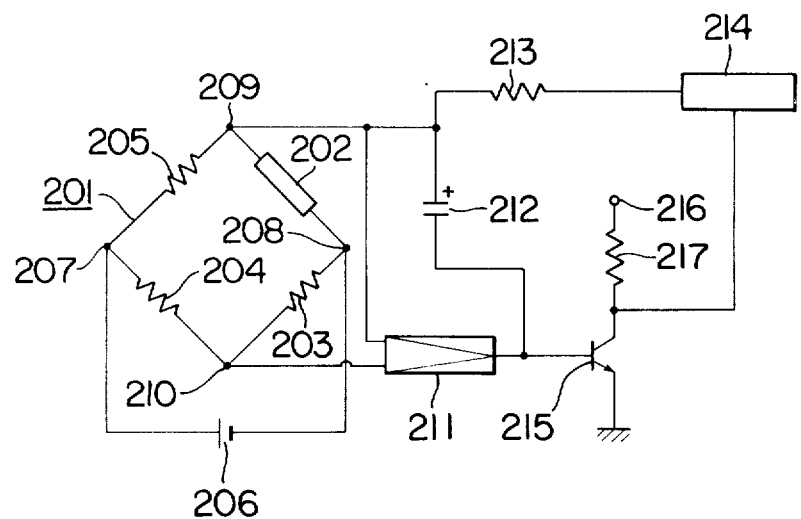
FIG. 1 is an electrical schematic including a bridge circuit used in one embodiment of the present invention.

At first, an embodiment of an electronic thermometer utilizing a microprocessor will be explained referring to the drawings, FIG. 1 to FIG. 4, FIG. 5A and FIG. 5B.

FIG. 1 is an electronic schematic circuit showing a construction of an embodiment of a bridge circuit, a charge-and-discharge circuit, and an interrupting circuit used in the present invention. In FIG. 1, 201 shows a bridge consisting of a temperature responsive transducer 202 and resistors 203, 204, 205, and a battery (or other power source) 206 connected to input terminals 207 and 208 of the bridge 201. The input of an operational amplifier 211 is connected to the output terminals 209, 210. Capacitor 212 is connected between output terminal 209 and the output terminal of the amplifier 211. The positive terminal of capacitor 212 is connected to a microprocessor 214 through a resistor 213. Numeral 215 shows a transistor for detecting a zero point having a base connected to the negative terminal of capacitor 212, a grounded emitter, and a collector connected through a resistor 217 to a voltage source. The collector is also connected with the microprocessor 214. Numerals 215, 216, and 217 constitute an interrupt circuit outputting an interrupt signal.

Figure 2:
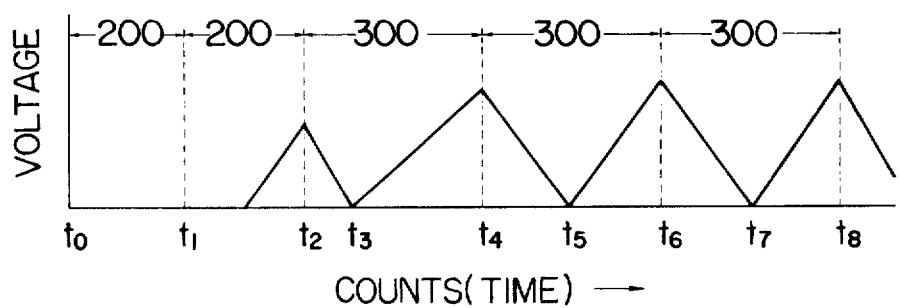
FIG. 2 is a graph to illustrate the operational theory of the present invention.

The operation of FIG. 1 will be explained as follows. A body temperature is transmitted to the temperature responsive transducer 202 having a resistance value which varies with temperature. As long as the temperature is not over 30°, the polarity of the voltage of the output terminals 209, 210 of the bridge 201 is reversed with respect to the polarity for charge of the capacitor 212 and the capacitor 212 is not charged owing to the interposed operational amplifier 211. When the temperature of the temperature responsive transducer 202 is over 30° C., the polarity of the output voltage on the output terminals 209 and 210 is oriented in a predetermined manner and capacitor 212 is charged. For this purpose the bridge 201 should be balanced when the temperature of the temperature responsive transducer 202 is 30° C. As described hereinafter, the microprocessor 214 counts to 200 at a count area (CR) (hereinafter count register) and thereafter detects whether the temperature of the temperature responsive transducer 202 is over 30° C., in other words, after every 200 counts, a determination is made as to whether the capacitor 212 is charged. An operation after the count 200 reached is described hereinafter. If at this point the temperature is over 30° C., the microprocessor 214 generates a discharge instruction and discharges the charge on the capacitor 212 through resistor 213. A MOS transistor (not shown in the drawings) for discharging the capacitor is included in the microprocessor 214 and conducts in accordance with a microprocessor instruction for discharge. When this instruction is received the charge on capacitor 212 is discharged through resistor 213 and the MOS transistor. When the charged voltage of the capacitor 212 drops to a predetermined value (zero voltage in this embodiment), a transistor 215 produces a signal introduced into the microprocessor 214 as an interrupt signal. The microprocessor 214 interrupted by the interrupt signal causes the MOS transistor to become nonconductive and the capacitor 212 to begin to charge again. The time at which the charging ends is prior to the time where the counting register (CR) counts to 200. The counting operation and discharge time are described in accordance with FIG. 2. Referring to FIG. 2, the count register CR counts 200 during the time points, t0 to t1 and t1 to t2, respectively. Every count to 200 the microprocessor 214 detects if the capacitor 212 is charged. When the capacitor 212 is charged at the time point t2, the microprocessor 214 allows a charge-and-discharge circuit (elements 211, 212, 213 and microprocessor MOS transistor in FIG. 1) to discharge. As described above, the capacitor 212 is charged by an output voltage of a predetermined polarity between the output terminals 209 and 210 produced by the temperature of the temperature responsive transducer being over 30° C. Accordingly the charged voltage is proportional to an exceeded value over 30° C. of the temperature responsive transducer. For example, at the temperature 36.5° C. of the temperature responsive transducer 202, an unbalanced voltage of the bridge 201 produced by the temperature 6.5° C. becomes a charged voltage for the capacitor 212. By setting proper resistance values for resistor 213 and the MOS transistor, a counted value of the counting register (CR) may be fixed at 65 during the period from a point of the capacitor beginning a discharge to the point where the transistor for zero point detection begins to produce an interrupt signal, namely from the time point t2 to the time point t3. In this case, the counting value from start to end of discharge represents the charged voltage of the capacitor 212 which is the output voltage of the bridge 201 produced at the temperature of the temperature responsive transducer 202 exceeding 30° C. by 6.5° C. On the condition that the temperature of the temperature responsive transducer 202 is 35° C., the counting register (CR) counts 50 in accordance with the temperature 5° C.

When the discharge ends at the time point t3 shown in FIG. 2, the microprocessor 214 allows the charge-and-discharge circuit to again start to charge capacitor 212 and begins an interrupt sequence which consumes an amount of time corresponding to 100 counts of the count register, the latter being disabled during the interrupt sequence. After executing the interrupt sequence the microprocessor 214 instructs a continuation of the counting in the counting register. The counting register (CR) begings counting where it left off when the interrupt signal was received, i.e., it counts from 65 to 200 when the temperature is 36.5° C. since it has already counted 65 prior to the generation of the interrupt signal. At a time point t4 ending this counting, the sum total of the counting value (200) of the counting register (CR) and a count value caused by the interrupt signal (whereby in the processing of the interrupting instruction a time equivalent to 100 counts of the counting register (CR) is consumed) is 300. The microprocessor 214 at the time point t4 again detects whether the capacitor 212 is charged or not, instructs a discharge if charged, and repeats this operation as many times as appropriate. During this repeat operation the temperature of the temperature responsive transducer 202 is assumed to rise to the same temperature as a body temperature for measurements. Until then, every 300 of the sum total count steps as shown at the time points, t4, t6, t8 in FIG. 2, the sum of the reference value of 300 and the counted value of the counting register (CR) at the end of capacitor discharge is computed. The reference value of 300 is the value corresponding to the temperature of 30° C. If the temperature of the temperature responsive transducer 202 at the time point t2 is 36.5° C., the counting value of the counting register (CR) at the time point t3 is 65 and 36.5° C. is computed by adding 300 to 65 and converting the value of 365 into temperature, i.e., 365 becomes 36.5° C.

While the temperature of the temperature responsive transducer 202 is rising to body temperature, for example, the counting value of the counting register (CR) at a current interrupt time point increases more than at the previous interrupt time point. The counting value, for instance, at the time point t5 is larger than at the point t3. When body temperature is reached, however, the counting value of the counting register (CR) remains constant when capacitor discharge is completed. Provided that the sum total of 300 and the counting value from start to end of discharge is memorized every time, the sum total of this time is compared with the sum total of the last time and if the sum total of this time is found to be not larger than the sum total of the previous time computed, the temperature of the temperature responsive transducer 202 is regarded as equivalent to the body temperature and the sum total value at that time is converted into temperature and indicated on a display.

The above mentioned operations performed by the microprocessor will be described with the aid of flow charts.

Figure 3:
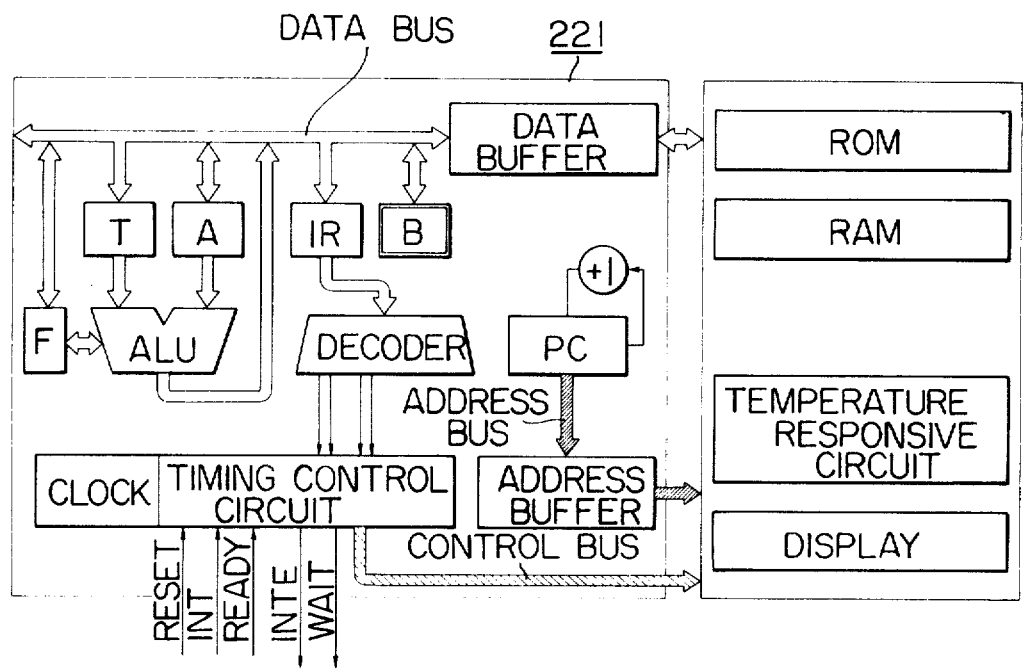
FIG. 3 is a block diagram of one embodiment of the present invention.
Figure 4:
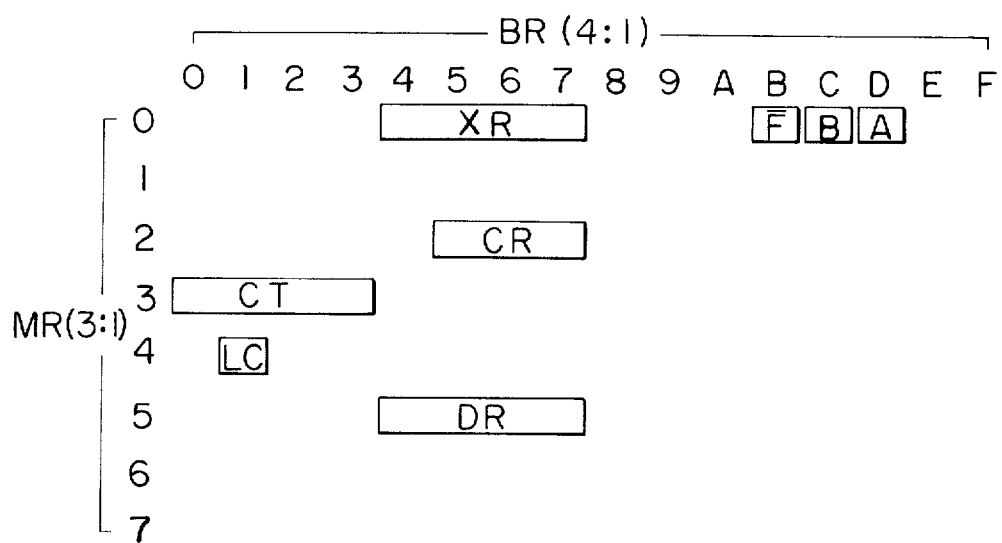
FIG. 4 is a representation of exemplary storage locations of the RAM shown in FIG. 3.

First, referring now to FIG. 3, structures internal to the microprocessor are described. Numeral 221 designates the microprocessor which contains registers F, T, A, B, an instruction register IR, a logic operation circuit ALU, a program counter PC, a +1 circuit, and other conventional microprocessor structures, e.g. clock, address buffer, decoder, bus lines, etc. The microprocessor 221 is connected with a read only memory (ROM) and random access memory (RAM) via conventional address and data bus lines. Referring to FIG. 4, a storage location of the RAM is described. In FIG. 4, an address for the RAM is fixed by BR (0 to 9, A to F) on an axis of abscissas and MR (0 to 7) on an axis of ordinates.

BR on the axis of abscissas is decided by the B resiter, and the axis of ordinates is decided by a program. In FIG. 4, CT, LC are counters, XR is a display register, CR is a counting register, DR is a data register, F, A, B are registers.

Figure 5A:
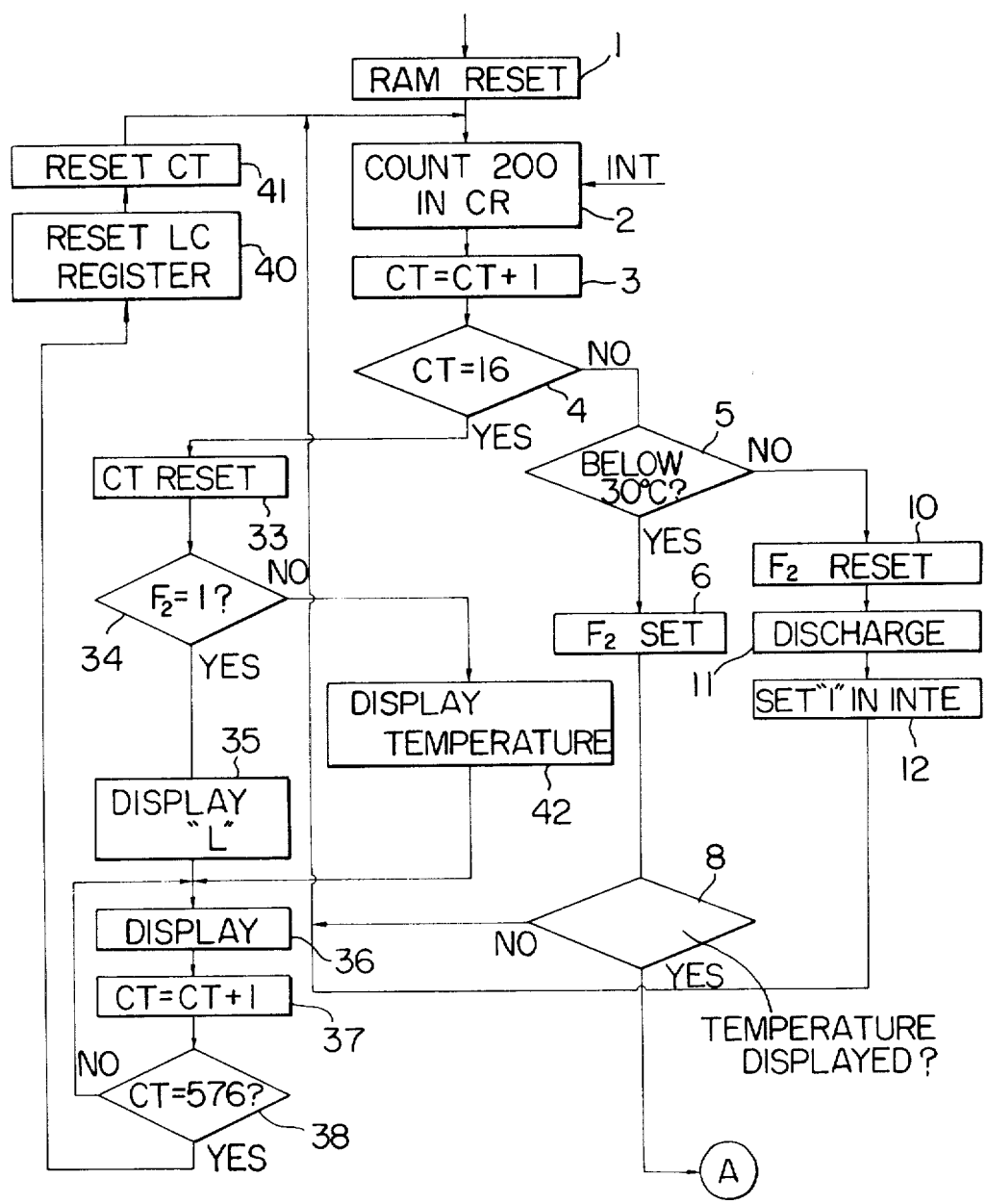
FIG. 5A, 5B, 6 and 7 are flow charts of the operational sequence performed by the microprocessor in accordance with the present invention.
Figure 5B:
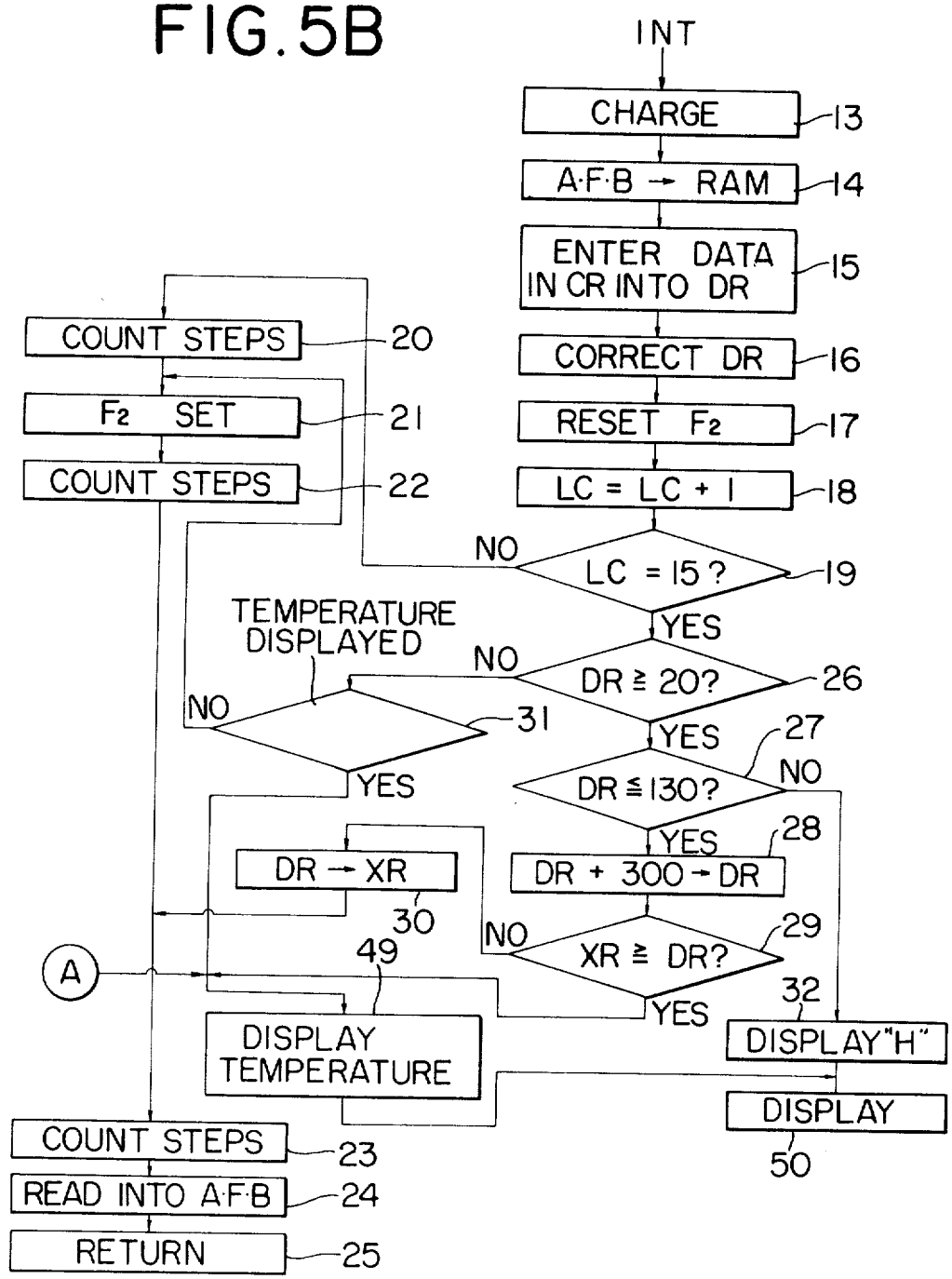

FIG. 5A and FIG. 5B are flow charts. There are some skipped numbers of steps or inquiries.

In a step 1, the RAM is reset. In a step 2, the microprocessor instructs the counting register CR to count 200. In a step 3 every 200 counted by the counting register CR adds +1 to the data in a counter CT. An inquiry step 4 judges if a data of the counter CT reaches 16. If NO, an inquiry step 5 judges if a temperature is 30° C. or less. If YES (30° C. or less), a step 6 allows a register F2 to set and an inquiry step 7 judges if a temperature display has ever been done.

As will be understood from the following description, if the temperature is 30° C. or less except after it is once over 30° C., for example, both data in DR and XR at the time point t1 are zero. Returning to step 2, until the counter CT is incremented by +1 and data in the counter CT reaches 16, the process flows from inquiry step 4 to inquiry step 5. For instance, if it is at the time point t2, the temperature of the temperature responsive transducer 202 has already reached 30° C. Then the result of the decision in inquiry step 5 if a temperature is below 30° C. should be NO. Then in step 10 the register F2 is reset, and in step 11 a discharge instruction is given from the microprocessor to the charge-and-discharge circuit, and in step 12 INTE is set to "1." By INTE being set to "1," the microprocessor is conditioned to accept an interrupt instruction. In step 2 the counting register CR continues to count, but when the charge-and discharge circuit discharges down to a predetermined value, namely in this embodiment it discharges down to zero voltage, the transistor 15 for zero voltage detection in FIG. 1 supplies an interrupt signal, this signal (INT) is supplied to the microprocessor, the step flows to step 13, and the counting in CR in step 2 is interrupted at that instant. This time point corresponds to t3 in FIG. 2, for example. When in step 13, a charge instruction is applied to the charge-and-discharge circuit and the capacitor again starts charging.

In step 14 the data in the registers A, F, B is transmitted to the RAM, and in step 15 the data in the counting register CR is applied to the data register DR. For example, if a counted value of the counting register at the time point t3 is 65, this counted value 65 is entered into the data register DR. In step 16, the data in the data register DR is corrected. If the counted value in CR supplied by an interrupting signal INT is, for example, at the moment of transition from 19 to 20, 9 at the least-significant digit turns to 0, the data in the counting register CR at the time point when 1 at the second stage is not yet changed to 2 is transmitted to the data register DR, the data in DR becomes 10. To take care of this problem the data in DR has to be corrected to 20. After the data in DR is corrected in step 16, the register F2 is reset in step 17, the counter LC is incremented by +1 in step 18. In the counter LC, the number of occurrences of the charge-and-discharge operation is counted so that the operation of charging and discharging in the charge-and discharge circuit is repeated 15 times. In inquiry step 19, the conditions whether LC=15 is determined. If a NO response is obtained the same number of steps is arranged to be consumed by the program in step 20 as in the case of the routine following a YES response. This is designed so that an equivalent step number to 100 in the counting register CR is consumed in any routine during the term from an interrupt instruction status to a status out of the interrupt instruction. In step 21, F2 is set. In step 22 and step 23, a number of steps is counted. In steps 22, 28, a predetermined step number is consumed for same purpose as in step 20. Data transmitted into the RAM is read into the registers A, F, B in step 24, and the process is returned to step 2 in step 25. Upon returning to step 2, the counting register CR restarts the counting which has been interrupted by the interrupt signal INT. For example, if at the point the interrupt instruction is received 65 has been counted, the remaining value of 135 is counted until the value 200 is counted, and on counting to 200, the processing sequence proceeds to step 3 to add +1 to the data in CT. After the time point t2 in FIG. 2, the operations from step 2 to inquiry step 5 and from step 10 to step 25 are repeated. Upon repeating this operation 15 times, the condition LC=15 is reached in step 18 and a YES response to inquiry step 19 causes the process to proceed to inquiry step 26. Inquiry step 26 checks if DR≧20. In this embodiment, however, a measurement is regarded as impossible when the temperature is below 32° C. or above 43° C., and a display of underrange or overrange is indicated. If a YES response for the inquiry DR≧20 is obtained a check is made in inquiry step 27 if DR≦130. a YES response in step 27 causes the addition of 300 to DR in step 28, then the condition XR≧DR is checked in inquiry step 29. The register XR should be loaded by the data in the data register DR as described hereinafter, and in the present case it is loaded by former data in the register ΔR. When at first LC=15 is obtained, data in the register DR is not yet entered into the register XR and a response to response 29 should be NO. Then proceeding to step 30, the data in the data register DR is entered into the register XR, in step 23 a predetermined number of steps are consumed, and the sequence proceeds to step 2 via steps 24, 25. The counter LC is reset on counted 15 by step 40 described hereinafter, and recounting begins from 1.

During the above mentioned operations, 2 to 5, 10 to 19, 26, to 30, 23 to 25, being repeated, the temperature of the temperature responsive transducer 202 becomes the same temperature as a body temperature to be measured. Thereafter, if DR≧20 in inquiry step 26 is YES and DR≦130 in inquiry step 27 is YES, a response to inquiry step 29 should be XR=DR and a temperature at that time is displayed in steps 49, 50. This displays a value added by 300 into DR converting it into a temperature. In this embodiment a calculated value in step 28 divided by 10 is displayed as a temperature.

A NO response to inquiry step 26 which determines DR≧20 results in a determination in inquiry step 31 if a temperature has been displayed. A response that a temperature has been already displayed in step 50 shows that it has once become DR≧20 and XR=DR (or XR≧DR) and the temperature responsive transducer 202 has been removed from a body, while an instruction for temperature display is made in step 49 and a maximum temperature measured up to then in step 50 remains on display. A response to inquiry step 31 that a temperature has not yet been displayed means that a temperature of the temperature responsive transducer 2 has yet reached a body temperature and a further increase is predicted. Since there may be, however, a case of a measured temperature below 32° C., the sequence is advanced to step 21, where it sets F2 and returns to step 2 through steps 22, 23, 24, 25.

A NO response to inquiry 27 to determine DR≦130 shows that a temperature of the temperature responsive transducer 202 has been already over 43° C. and is over a precise temperature measure range, so that an instruction for "H" is made in step 32 and "H" is displayed on a display in step 50. This "H" shows that a measured temperature is over a measuring range of the system and that measurement is impossible.

If there is a NO response in inquiry step 26 and a sequence returns to step 2 through step 21 to 25 on a NO response to inquiry step 31 and further if there is a NO response to inquiry 4 to determine if CT=16, inquiry 5 determines if a temperature <30° C. The continuing operation to step 10 will be repeated if a NO response is obtained to inquiry step 5. If the response to inquiry 5 is YES, F2 is set in step 6, inquiry 8 determines if a temperature has been already displayed. If a temperature display has not been made, the temperature of the temperature responsive transducer should be rising and the sequence should return to step 2. If the temperature has already been displayed, the temperature of the temperature responsive transducer 202 should be lowered by being removed from a body to a lower temperature than the former measured value, so that a maximum temperature so far is displayed in step 50. In the above operations, a response of CT=16 in inquiry 4 proceeds to step 33 and resets the counter CT, and inquiry 34 determined if F2=1. If at that time the temperature is below 30° C. or LC does not yet equal 15, F2 is set in step 6 or 21 and F2=1 exists, so that an instruction for "L" is produced in step 35 and "L" is displayed on the display in step 36. Then in step 37, +1 is added to the contents of counter CT. On counting up 576 during one second passes in CT, the LC register is reset in step 40, the CT counter is reset in step 41 and the sequence is returned to step 2. A response to inquiry step 34 that F2 is not set gives an instruction to display a data entered into the display register XR at a temperature in step 42 and proceeds to the routine 36, 37, 38 to display the data "a temperature" for one second in the same manner as a display "L."

As it will be apparent from the foregoing description, in this case, "L" is displayed for one second until the temperature is over 32° C. during the period where a temperature is rising from a start of measurement. Data is not displayed as long as CT does not yet count to 16 in inquiry step 4 (1.5 seconds in this embodiment), the temperature upon exceeding 32° C. is displayed for one second, and then a blank term of 1.5 second without any display, so that a flickering display is produced. If the temperature drops below 32° C. after exceeding 32° C. or exceeds 43° C., the maximum temperature during the measurement which is entered into the register XR or "H" is respectively continuously displayed.

Figure 8:
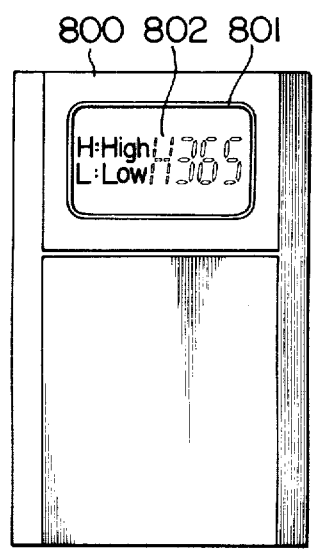
FIG. 8 is a front view of an electronic thermometer.
Figure 8:
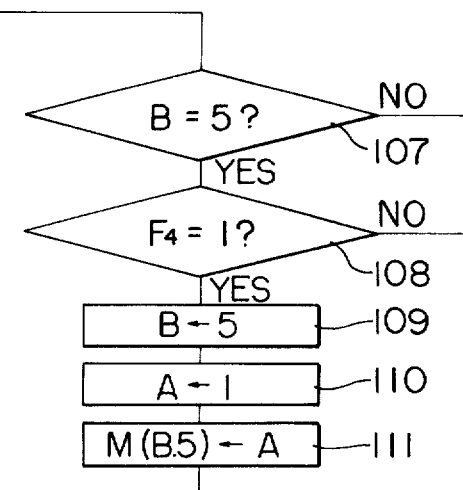

FIG. 8 is a front view of an electronic thermometer. Numeral 800 is the electronic thermometer, while numeral 801 is the display. In FIG. 8, a number 36.5 (showing a temperature) is shown, other temperatures will of course, be displayed when other measured temperatures exist within the temperature measuring range. In an portion 802 of the display, "H" or "L" will be displayed when a temperature is measured which is over or under the measuring range of the apparatus.

Although in this embodiment, "H" or "L" is displayed to indicate out of bounds measurements, other means for signalling this event, such as by a sound, is also available.

Now referring to FIG. 6, an operation to count 200 in CR in step 2 in the flow chart shown in FIG. 5A will be described.

Figure 6:
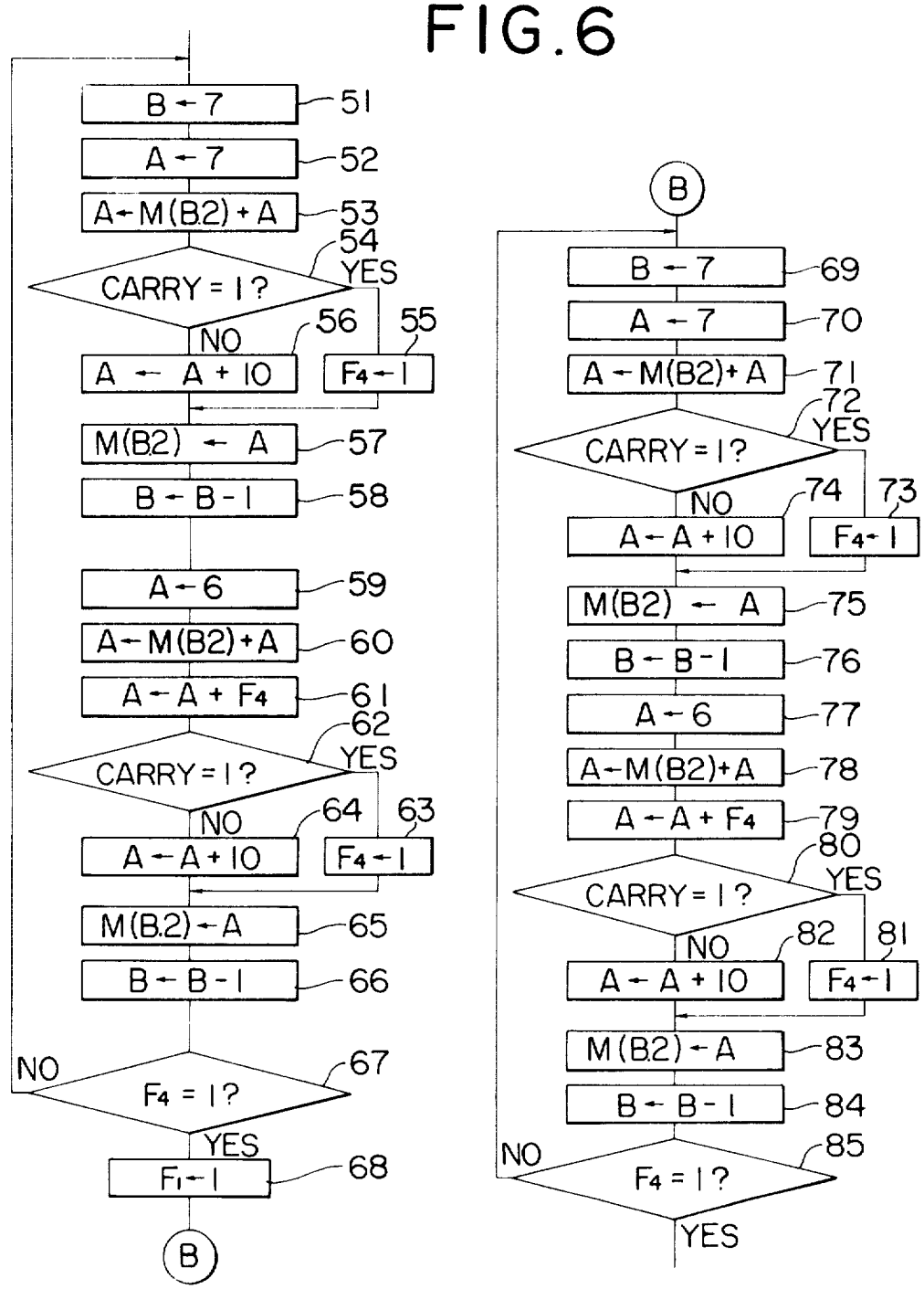

When in step 2 shown in FIG. 5A an instruction from the microprocessor is given to the counting register CR to count 200, as shown in FIG. 6, in step 51 a numerical value of 7 is entered into the register B, in step 52 a numerical value of 7 is entered into the register A, in step 53 the contents of RAM at the address M(B.2) (the first column of CR in FIG. 4) decided by a numerical value of the register B (being 7) and numerical value 2 i.e., 7.2 is read out and is added to the data in the register A. At that time CR has not yet counted and the data is zero and data in the first stage should be zero. In inquiry step 54 it is checked if a carry comes out from the register A. The registers A, B have 4 bits, respectively. Register A will not produce any carry since its contents remain 7 even if the data (zero) in the first stage of CR is added. Accordingly there is a NO response to inquiry 54. The NO response adds 10 to the data in the register A in step 56, and feeds the data in the register A into the address M (B.2) in step 57. Then the data in the register B is 7, so that M (B.2) is an address in the first stage of CR in RAM, the data in the register A when added by 10 becomes 17, and the data in the register A becomes 1 by a carry 1 coming out. Entry of this into M (B.2) causes the first stage of CR to be incremented by 1. Then in step 58 the data in the register B is 6, the content of register B having been subtracted by 1, and in step 59 the data in the register A is set to 6. In step 60, the data at the address M (B.2), namely the data in the second stage (zero at present) of CR, is read out, the read out value is added into the data in the register A, and the added value is entered back into the register A. At this point the data in the register A remains at 6. In step 61, the data in the fourth bit of the register F (F4) is added into the register A. But 1 does not yet appear in this fourth bit and the data is zero. As a result, the data in the register A remains 6, and a response to inquiry step 62 to check if any carry comes out from the register A is NO. In step 64 the data in the register A has 10 added thereto (the data in the register A now being 0 since an addition of 10 is 16), in step 65 the data in this register A is entered into the address M (B.2). At that time the data in the register B is 6, so that the address M (B.2) is the second stage of CR. Accordingly, the data in the second stage of CR remains zero. In step 66 1 is subtracted the data in the register B is subtracted by 1, in inquiry step 67 the condition F4=1 is checked. If F4 is 0 and a response to inquiry step 67 is NO the process returns to step 51. With respect to the operations performed so far, a 1 has been read into the first stage of CR in RAM and a counting step to count 1 has been performed once.

In step 51 the register B is again set to 7, in step 52 the register A is set to 7, in step 53 the data (1 in this embodiment) at the address M (B.2) (the first stage of CR) is read out and is added to the register A, and in inquiry step 54 a carry check is performed. At this point no carry occurs since the data in the register A is now 8. The process proceeds to step 56, whereby 10 is added into the data in the register A (in this case the data in the register A becomes 2 by the carry 1 coming out), and in step 57 this value (2) is entered into the address M (B.2) in RAM. Therefore the data in CR at the first stage becomes 2. 1 is subtracted from the data in the register B in step 58, 6 is entered into the register A in step 59, the data at M (B.2) (the data in the second stage in CR, currently zero) is read out and is added into the register in A in step 60. As a result, the data in the register A remains 6. In step 61, $F_4$ is added into the register A but $F_4$ is zero, so that a response to inquiry step 62 to check if a carry has come out is NO. In step 64, 10 is added into the register A (at that time carry 1 coming out from the register A and the value of the register A being zero) and the value of the register A (zero) is entered into the address M (B.2) in RAM (while the data in the register B is 6). That is, zero is entered into the second stage in CR. Thereafter, 1 is subtracted from the contents of the register B in inquiry step 66, the condition $F_4 = 1$ is checked in inquiry step 67, and since the response is NO, the process returns to step 51. In the above operations, the data in CR at the second stage remains zero, and the data in the first stage has become 2. That is, the operation to count 1 has been performed twice and a 2 has been counted.

After the data in the first stage in CR has become 9 by repeating the above counting operation 9 times (the data in the second stage being 0), in the tenth counting operation M (B.2) +A is 16, and by entering this into the register A the carry 1 occurs and the data in the register A becomes zero. Since a response to inquiry 54 if YES, $F_4$ is set to 1 in step 55. In step 57, the data in the register A (zero) is entered into the address M (B.2) (the first stage in CR), and the data in the first stage in CR is zero. 1 is subtracted from the data in the register B which becomes 6 in step 58, the data in the register A is 6 in step 59, the data (zero) at the address M (B.2) is read out and is added into the register A in step 60, the data in the fourth bit $F_4$ of the register F is added to the data in the register A and the result entered into the data in the register A in step 61. This causes the data in the register A to be 7. A NO response to inquiry 62 to determine if the carry is 1 proceeds to step 64 where 10 is added to the data in the register A. At that time a carry 1 occurs from the register A and the data in the register A becomes 1. This value is entered into the address M (B.2) (the second stage of CR since B is 6) in step 65. In step 66, only 1 is subtracted from the data in the register B and a NO response to inquiry step 67 which checks if $F_4 = 1$ returns the process to step 51. In this counting operation, the data in the first stage in CR has become zero, while the data in the second stage has become 1; that is 10 has been counted in CR. In the counting steps from the eleventh to the 19th, like the counting steps from the first to the ninth, the data in the first stage of CR progresses towards 9 from 1, one by one, while the sequence proceeds to step 56 from inquiry 54 because of no carry coming out. Since the data at the address M (B.2) (the second stage) is 1, the data in the register A is turned to 7 in step 60, 10 is added to the data in the register A in step 64, and 7+10=17 is performed, so that the carry 1 comes out and the data in the register A becomes 1. Then in step 65, the data at M (B.2) is set to 1, so that in the operation from the eleventh to 19th counting cycles the numerical value at the first stage of CR is added one by one, while the numerical value in the second stage remains 1. In the 20th counting cycle the data in the first stage in CR has already been 9, so the inquiry step 54 produces carry 1, $F_4$ is set to 1 in step 55, the data in the register A turns to 0, and in step 57, the data at the address M (B.2) (the first stage in CR) of RAM is turned to zero. The data in the register A is set to 7 in step 60 and to 8 in step 61, so that in step 64, A +10 is turned to 18, a carry 1 coming out causes the data in the register A to be 2, this 2 is entered into the address M (B.2) (the second stage of CR) in step 65, and the sequence will return to step 51. Accordingly the second stage of CR turns to 2, the first stage of CR turns to zero, and the counting value in CR becomes 20.

After the above counting operations are repeated 99 times, both the second and the first stages are 9. In the 100th counting operation, M (B.2) +A is 16 in step 53. And then carry 1 comes out from the register A, the data in the register A returns to zero, a YES response to inquiry 54 makes $F_4$ equal 1 in step 55, in step 57 zero is entered into M (B.2) (the first stage of CR), in step 60 M (B.2) +A is 15, in step 61 A+$F_4$ is set to 16, so that a carry 1 comes out from the register A and the data in the register A returns to zero. Thereafter a response to inquiry step 62 is YES, $F_4$ is 1, and in step 65 zero is entered into M (B.2) (the second stage of CR). A response to inquiry 67 is YES and $F_1$ is set to 1 in step 68. The state that $F_1$ is 1 shows the counting value in CR becomes 100 after the operations to count 1 are repeated 100 times.

The sequence after $F_1$ is turned to 1 proceeds to step 69. The operations from step 69 to inquiry step 85 are wholly equivalent to the operations from step 51 to inquiry step 67. When CR counts up to 100, $F_4$ will be 1 in step 81 and a YES response to inquiry step 85 will appear. Then CR will count 200 in total, and the sequence will return to step 3 as shown in FIG. 5A.

As it will be understood from the above embodiment as shown in FIG. 6, CR counts from 0 to 100 during from step 51 to inquiry 67, so that the number of steps to count 1 for the above counting cycle may be 15. If CR counts from 0 to 200, the number of steps needed to count 1 for the above counting will need to be about twice as many as in this embodiment. From step 60 to inquiry step 85, CR further counts from 0 to 100 and the number of steps to count 1 for the above term needs 15 as in the case from step 51 to inquiry step 67. This can be about half of the step number in comparison with simply counting from 0 to 200, since in this case 100 is counted from step 51 to inquiry step 67 and a further 100 is counted from step 69 to inquiry step 85 so as to be a total of 200. The number of steps to count 1 from step 51 to inquiry 67 is equivalent to the number of steps to count 1 from step 69 to inquiry step 85. As described counting from step 69 to inquiry step 85 is a counting which occurs after CR counts 100 and $F_1$ is 1, and is an operation to count from the value 100 to 200.

Figure 7:
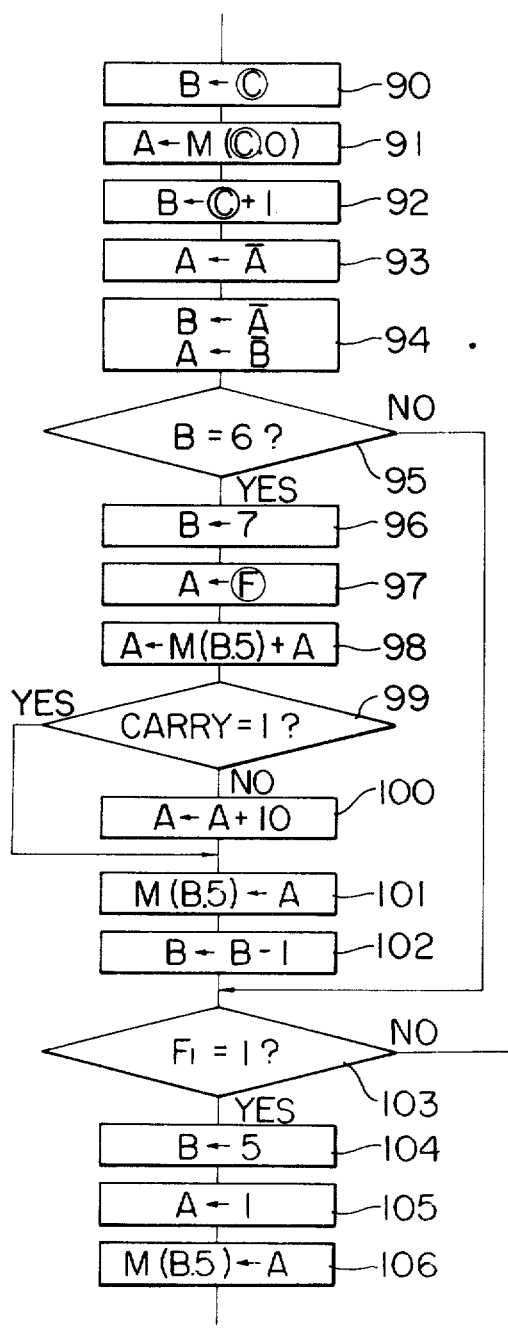

Now referring to FIG. 7, the operation for the correction performed in step 16 will be described. After an interrupt signal INT is received in step 2 in FIG. 5A, the step 13 produces a charge signal into a charge-and-discharge circuit in step 14, the data in the registers F, A, B is transported to the registers F, A, B, of RAM, and in step 15 the data in CR is entered into DR. Numerals 90 to 111 marked at the side of each block in FIG. 7 shows each step number of inquiry step number as was done for FIGS. 5A, 5B and 6. First, in step 90 a value of Ⓒ which decides an address (axis of abscissas) in FIG. 4 is entered into the register B. Ⓒ shows a numerical value corresponding to the location of C on axis of abscissas in FIG. 4, and in this embodiment it shows a numerical value of 12. In step 91, the data at the address M (Ⓒ.0) (the address of the register B in RAM shown in FIG. 4 into which the data in the register B is transported in step 14) is read out and is entered into the register A. In step 92, the data in the register B is turned to Ⓒ +1. This value is 13. In step 93, the data at the address (B.0) of RAM (the register of RAM shown as A) is logically negated and enters to the register A. In step 94 the data in the register A is logically negated and enters to the register B, and the data in the register B is logically negated and enters to the register A. This means that the data in the registers A, B, which have been stored in RAM in step 14 by an interrupt signal have again returned to the registers A,B.

Inquiry step 95 determines if B=6. As shown in FIG. 6 the data in the register B is set to 7 in step 51, to 6 in step 58 and to 5 in step 66. Therefore, if there has been a response of B=6, it means that during the sequence from step 57 to step 65 in FIG. 6 counting in CR has been interrupted and a counting value at that time in CR has been entered into DR. The data in the register B is set to 5 in step 66. But since the data in the register B is set to 5 when in step 65 [M(B.2)←A] is performed—in other words, the second stage of CR may be incremented by 1 if $F_4=1$ in step 61—a fact that a value in the register B is 6 shows counting in CR has been interrupted before step 65. When the first stage of CR is added by 1 in step 57, the value in the register B is set to 6. Recounting the uncounted counts in CR after interruption must start from step 51 in FIG. 6 because count 1 in CR should be completed when the inquiry step 67 or 85 is performed. Before this the data in the first stage of DR should have 1 subtracted therefrom as long as B=6 is determined in step 95, and its processing sequence is described hereinafter.

Upon a response B=6 to inquiry 95, in step 96 the register B is set to 7, in step 97 the register A is loaded by Ⓕ (exemplary value 15 as shown in FIG. 4), and in step 98 M (B.5) +A is performed and the result stored in A. Since B=7, M (B.5) is the address in the first stage of DR as shown in FIG. 4. Unless the data at the address M (B.5) is zero, carry 1 appears whenever M (B.5) +A is entered into register A and the data in the register A becomes a value subtracted by 1 from the data at the address M (B.5). For example, if the data at the M (B.5) (the first stage of DR) is 1, M (B.5) +A=16 is made since A=15, and it is entered into the register A so that carry 1 is produced and the data in the register A becomes zero. Of if the data at M (B.5) is 5 and M (B.5) +A is entered into the register A, carry 1 appears and the data in the register A will be 4. In this manner, upon a YES response to inquiry step 99 to determine if carry 1 occurs, the data in the register A is entered into M (B.5). Accordingly the data at M (B.5), namely the data at the first stage of DR, is subtracted by only 1. This is a correcting operation so as to subtract 1 from DR since counting in CR is interrupted after +1 is added to CR in step 57 and the counted value in CR at that time has been once brought to DR. And then, the data in the register B is subtracted by only 1, in step 102. Inquiry step 103 determine if $F_1$ equals 1 ($F_1=1$). A NO response to inquiry step 103 indicating that CR has not yet counted to 100 causes the process proceeds to inquiry step 107 to determine if B=5, and a NO response to inquiry step 107 because of B being 6 causes the process to proceed to step 17.

In the above operation, if carry 1 is not obtained in inquiry step 99—that is, the data at the address M (B.5) is zero—the first stage of CR is zero, indicating that counting in CR before 1 is added to the second stage is interrupted, and then the data in CR is transported to DR. Accordingly, the first stage in this case of CR remains zero and the second stage is not yet incremented by 1. Therefore when the first stage in DR is corrected to 9 and counting in CR is restarted, a counting operation should again be made from step 51.

To perform this correction, the processing sequence proceeds from inquiry step 99 to step 100 where 10 is added to the register A. Since the data in the register A is Ⓕ =15 so far, the data in the register A becomes 9 when 10 is added thereto. This value in the register A is entered into M (B.5) in step 101 and the data in the first stage of DR is set to 9. The data in the register B is subtracted by only 1 in step 102, the condition $F_1=1$ is determined in inquiry step 103 and if a NO response occurs the process proceeds to inquiry step 107 and proceeds to step 17 after ending a correction operation because B does not equal 5 (B≠5).

In the above case, if $F_1=1$ in inquiry step 103, it shows that CR has already counted 100. Then the register B is set to 5 in step 104, the register A is set to 1 in step 105, the address M (B.5) is entered by the numerical value 1 (from A) in step 106. The address M (B.5) is the third stage of DR in FIG. 4 and has a 1 entered from the register A. After that, the process proceeds to step 17 in FIG. 5B.

A NO response to inquiry step 95 (B≠6) causes the process to proceed to inquiry step 103. B≠6 and B=7 means that the counting step in CR is interrupted prior to step 57 where in the interrupted step the first stage of CR is not incremented by 1. If B=5, however, it means that it has been interrupted in the steps following after step 65 and the second stage of CR is added by 1 in this case. If B=6 does not exist, the process proceeds to inquiry step 103 to determine if $F_1$ equals 1, and a NO response to this inquiry causes a determination whether B=5 to be made in inquiry step 107. If B=5 is not present, B should be equal to 7, the first stage of CR is not incremented by 1, and further the second stage is not incremented by 1. Therefore, no correction is necessary and the sequence proceeds to step 17 in FIG. 5B from inquiry 107.

When B is not 6 in inquiry 95 and B is 6 in inquiry 107, the condition $F_4=1$ is determined in inquiry step 108. If $F_4$ is not 1, it means that counting in CR has not yet reached 100. As a result, no correction is necessary, and sequence proceeds to step 17 in FIG. 5B from inquiry 108.

If $F_4$ is 1 and a response to inquiry 108 is YES, it means that counting value in CR has reached 100. In other words, the counting value in CR is transported from 99 to 100, and then is stopped at the time point when the data in the first and the second stages are zero. Therefore, the data in the third stage of DR should be 1. Accordingly, in step 109 the register B is set to 5, in step 110 the register A is set to 1, and in step 111 the value in the register A is entered into the RAM at the address M (B.5). Then the data in the register B is 5, the address M (B.5) of RAM is the third stage of DR in FIG. 4, and in step 111 the third stage of DR is set to 1. The sequence from step 111 proceeds to step 16.

If $F_1$ is determined as 1 in inquiry step 103, in step 104 the register B is set to 5, in step 105 the register A is set to 1 and in step 106 the 1 in the register A is entered into RAM at the address M (B.5). Since the address M (B.5) is the third stage of DR, in step 106 the third stage of DR, is set to 1. Thereafter, the process proceeds to step 16 in FIG. 5B.

The above description is based on steps from step 51 to inquiry step 67 or step 68, but step 69 to inquiry step 85 correspond to step 51 to inquiry step 67, respectively. Therefore, when counting in CR is interrupted between step 69 and inquiry step 85, a correcting operation is done in the same manner as when the interruption occurs between step 51 and inquiry 67. However, $F_1$ is usually 1 between step 69 and inquiry step 85. Accordingly, there is always YES response to inquiry 103 step in this case, and the third stage of DR is set to 1.

As understood from the above description, the present invention provides the following operations:

When a point where counting in CR is interrupted by an interrupt signal is while the data in the register B is 7—namely, before the first stage of CR is incremented by 1 in step 57—the data in DR will not be corrected.

When the data in the register B is 6—it is after the data in the first stage of CR has been added by 1 in step 57 and before the data at the second stage of CR is added by 1 in stage 65—the data at the first stage of DR is subtracted by 1 unless it is zero, or is corrected to 9 if it is zero. When the value of the register B is 5 and the data at the second stage of CR has been incremented by 1, the third stage of DR will be set to 1 if $F_4$ has been 1, or will not be set to 1 if $F_4$ has not been 1. When an interrupt occurs between step 69 and inquiry step 85, an equivalent correction to that described above will be made, and a correction will occur to change the data in the third stage of DR to 1 because of $F_1$ being 1. When counting in CR again starts after an interruption, the counting will start from step 51 (or step 69 if over 100 has been counted). Then if an interruption occurs after 1 is added to the first stage of DR, this 1 is cancelled. If the first stage of DR is zero, and the second stage is not yet incremented by 1 when a count value in CR is exceeding 9, the first stage of DR is set to 9. When an interruption is made at the point when the counting value in CR is over 99 and just 100, the data in the third stage of DR is corrected to 1. In this manner, a counting value in DR restarting after the interrupt occurs can be corrected to a proper value.

What is claimed is:

1. An electronic thermometer comprising:
   a display for displaying a temperature;
   a bridge circuit having a temperature responsive transducer in a branch thereof for producing an unbalanced voltage with a predetermined polarity when a reference temperature is exceeded;
   a charge-and-discharge circuit including a capacitor connected to said temperature responsive transducer which is charged by said unbalanced voltage;
   a microprocessor provided with a reference value corresponding to said reference temperature, a counting means for counting a count equivalent to said reference value and means for discharging said charge-and-discharge circuit if a temperature of said temperature responsive transducer is exceeding said reference temperature when said counting means counts to said counted value; and
   an interrupt circuit for applying an interrupt signal to said microprocessor when said charge-and-discharge circuit discharges down to a predetermined value;
   said microprocessor provided with means for computing a temperature corresponding to an added value, said added value being determined by adding a value which is counted from the time of the start of said discharge until the time said interrupt signal is produced to said reference value, said microprocessor further including means for causing a display of said added value on said display.

2. An electronic thermometer as set forth in claim 1, wherein said microprocessor communicates with a ROM and RAM during execution of its processing sequence.

3. An electronic thermometer as set forth in claim 1, wherein said microprocessor is provided with a counting area in a memory for storing said value which is counted from said start of discharge until said interrupt signal is produced, and is further provided with an operation sequence in which a constant counted value is reached after said charge-and-discharge circuit discharges down to said predetermined value, said counting area performing a count from said stored value to said count equivalent to said reference value and said charge-and-discharge circuit being discharged when said count equivalent to a reference value is reached.

4. An electronic thermometer as set forth in claim 1 further comprising means for indicating that a temperature is not within a predetermined temperature range.

5. An electronic thermometer as set forth in claim 4 wherein said indicating means causes a display of a letter meaning high when said temperature is over said predetermined temperature range or a letter meaning low when said temperature is under said predetermined temperature range.

6. An electronic thermometer as set forth in claim 4 wherein said indicating means displays "H" when said temperature is over said predetermined temperature range or "L" when said temperature is under said predetermined range, said microprocessor including means for presenting a display of measured temperature out of said predetermined range.

7. An electronic thermometer comprising:
   a display for displaying a temperature;
   a bridge circuit having a temperature responsive transducer in a branch thereof for producing an unbalanced voltage with a predetermined polarity on exceeding a reference temperature;
   a charge-and-discharge circuit including a capacitor connected to said temperature responsive transducer which is charged by said unbalanced voltage;
   a microprocessor provided with a reference value corresponding to said reference temperature, a counting means for counting to a count value equivalent to said reference value, and means for discharging said charge-and-discharge circuit if a temperature of said temperature responsive trnasducer is exceeding said reference temperature when said counting means counts to said count value; and
   an interrupt circuit;
   said microprocessor operating to perform a detecting sequence for detecting a temperature over said reference temperature;

said charge-and-discharge circuit being response to a detection output produced in said detecting sequence as a discharge signal;

said interrupt circuit producing an interrupt signal when said charge-and-discharge circuit discharges down to a predetermined value in response to said discharge signal;

said microprocessor performing a counting sequence for counting a value from the start of said discharge until said interrupt signal is produced;

said microprocessor being responsive to said interrupt signal to interrupt the counting sequence and initiate an operation sequence for computing a temperature in accordance with a counted value accumulated in said counting sequence when said interrupt signal is produced.

8. An electronic thermometer comprising:

a bridge circuit having a temperature responsive transducer inserted in an arm thereof for producing an unbalanced voltage with a predetermined polarity on exceeding a reference temperature;

a charge-and-discharge circuit having a capacitor connected to said temperature transducer for being charged by said unbalanced voltage;

a microprocessor provided with a reference value corresponding to said reference temperature, a counting sequence for counting to a count equal to said reference value, a detecting sequence for detecting if a temperature of said temperature responsive transducer is over said reference temperature whenever said count equals said reference value, and means for producing a discharge signal which is applied to said charge-and-discharge circuit if a reference temperature is exceeded when said count reaches said reference value, said discharge signal allowing a charged voltage of said charge-and-discharge circuit to discharge;

an interrupt circuit for detecting when said charge-and-discharge circuit discharges down to a predetermined value and for then providing an interrupt signal to said microprocessor, said interrupt signal interrupting the counting toward said reference value in said counting sequence; and an operation sequence carried out in said microprocessor for reading a counted value in said counting sequence existing when said interrupt signal is received and for computing a temperature therefrom;

said counting sequence including a first counting sequence for counting up to a predetermined value less than said reference value from zero and a second counting sequence for counting up to said reference value from said predetermined value, the number of steps in said first and second counting sequences being equal and each sequence counting a "1" value when executed.

9. An electronic thermometer comprising:

a bridge circuit having a temperature responsive transducer inserted into its arm for generating an unbalanced voltage with a predetermined polarity on exceeding a reference temperature;

a charge-and-discharge circuit including a capacitor connected to said temperature responsive transducer which is charged by said unbalanced voltage;

a microprocessor provided with a reference value corresponding to said reference temperature, a counting sequence for counting to a count equivalent to said reference value, and a detecting sequence for detecting if the temperature sensed by said bridge circuit exceeds said reference temperature after determining from said counting sequence when a counted value reaches said reference value and applying a discharge signal to said charge-and-discharge circuit if said reference temperature is exceeded;

an interrupt circuit for determining when a charged voltage of said charge-and-discharge circuit, upon discharging, reaches a predetermined value and applying an interrupt signal to said microprocessor when said charged voltage reaches said predetermined value;

said microprocessor interrupting counting in said counting sequence which was initiated at the start of said discharge in response to receipt of said interrupt signal, and performing an operation sequence to form a temperature measurement by reading a counted value accumulated in said counting sequence at the time of interruption; said microprocessor further performing a correction sequence as part of said operation sequence for correcting a counted value in said counting sequence in response to a position of said counting sequence at the time of being interrupted by said interrupt signal.

10. An electronic thermometer as set forth in claim 9 wherein said microprocessor communicates with a ROM and RAM during execution of its processing sequence.

* * * * *